(12) United States Patent
Hu

(10) Patent No.: US 10,836,288 B2
(45) Date of Patent: Nov. 17, 2020

(54) SEAT ARMREST

(71) Applicant: Yao-Chuan Wu, Chiayi Hsien (TW)

(72) Inventor: Guoqiang Hu, Nansha Economic Development District (CN)

(73) Assignee: Yao-Chuan Wu, Chiayi Hsien (TW)

( * ) Notice: Subject to any disclaimer, the term of this patent is extended or adjusted under 35 U.S.C. 154(b) by 0 days.

(21) Appl. No.: 16/423,644

(22) Filed: May 28, 2019

(65) Prior Publication Data

US 2020/0307431 A1   Oct. 1, 2020

(30) Foreign Application Priority Data

Mar. 25, 2019   (CN) .......................... 2019 1 0229884

(51) Int. Cl.
*B60N 2/75* (2018.01)
*B60R 7/04* (2006.01)

(52) U.S. Cl.
CPC ............... *B60N 2/767* (2018.02); *B60N 2/77* (2018.02); *B60N 2/777* (2018.02); *B60R 7/043* (2013.01)

(58) Field of Classification Search
CPC ........ A47C 7/541; B60N 2/767; B60N 2/777; B60N 2/77; B60R 7/043
See application file for complete search history.

(56) References Cited

U.S. PATENT DOCUMENTS

| 4,496,190 A * | 1/1985 | Barley | B60N 2/767 297/411.38 |
| 4,763,860 A * | 8/1988 | Vauvelle | B64D 11/00 244/122 R |
| 5,169,207 A * | 12/1992 | Rye | A47C 1/03 297/411.33 |
| 5,536,070 A * | 7/1996 | Lemmen | A47C 1/03 297/411.36 |
| 5,655,814 A * | 8/1997 | Gibbs | A47C 1/03 248/118 |
| 5,752,683 A * | 5/1998 | Novis | A47C 1/03 248/118 |
| 6,003,947 A * | 12/1999 | Rye | A47C 1/03 188/67 |
| 6,513,877 B1 * | 2/2003 | Ikeda | B60N 2/7017 297/411.33 |

(Continued)

FOREIGN PATENT DOCUMENTS

CN   208101783 U   11/2018

*Primary Examiner* — Philip F Gabler
(74) *Attorney, Agent, or Firm* — Thomas J. Nikolai; DeWitt LLP

(57) ABSTRACT

A seat armrest comprises an elbow-rest segment, an arm-rest segment, a mobilizable connecting structure, and a height-locking structure. The elbow-rest segment is connected to a seat. Both the mobilizable connecting structure and height-locking structure are connected to the elbow-rest segment and the arm-rest segment. The mobilizable connecting structure facilitates the arm-rest segment to surround the mobilizable connecting structure to pivot toward a space above the elbow-rest segment. When the arm-rest segment is pivoted to any desired height, the height-locking structure can fix the arm-rest segment on that desired height. As a result, the user can adjust the height of his forearm on the arm-rest segment freely at different heights according to different occasions, so that the user can rest his forearm comfortably.

8 Claims, 20 Drawing Sheets

(56) References Cited

U.S. PATENT DOCUMENTS

| | | | | |
|---|---|---|---|---|
| 6,773,071 B1* | 8/2004 | Stasney | ............... | A47C 7/546 |
| | | | | 248/118.3 |
| 7,055,910 B2* | 6/2006 | Wright | ............... | A61F 5/3761 |
| | | | | 297/411.23 |
| 7,195,312 B2* | 3/2007 | Crossman | ............ | B60N 2/767 |
| | | | | 297/216.1 |
| 9,282,826 B1* | 3/2016 | Hickman | ............... | A47C 7/62 |

* cited by examiner

SEAT ARMREST

CROSS-REFERENCE TO RELATED APPLICATIONS

This application is based upon and claims priority under 35 U.S.C. 119 from China Patent Application No. 201910229884.0 filed on Mar. 25, 2019, which is hereby specifically incorporated herein by this reference thereto.

BACKGROUND OF THE INVENTION

1. Field of the Invention

The present invention relates to a seat armrest, especially to a seat armrest that can be pivoted relative to a seat.

2. Description of the Prior Arts

A conventional seat is usually installed with armrests to allow the user to lay his arms, thereby enhancing the overall seating comfort. China utility model with patent No. CN208101783U discloses a seat armrest, in which an end of the armrest is pivotally connected to a seat. When a user needs to use the armrest, the armrest can be pushed to be pivoted up relative to the seat to a desired height, so that the user can lay his arm on the armrest.

However, the aforementioned armrest only can be pivoted to stop at one single specific angle, such that the user's arm only can rest on the armrest in the same posture. But the postures of the user's arm are different in different occasions, such as when using a cell phone, typing on the keyboard, playing games, or reading books. The most comfortable postures for the arm are different in said different occasions. However, the conventional seat armrest cannot provide comfortable support adapted to different arm postures, and thus needs to be improved.

To overcome the shortcomings, the present invention provides a seat armrest to mitigate or obviate the aforementioned problems.

SUMMARY OF THE INVENTION

The main objective of the present invention is to provide a seat armrest that can be pivoted to stop at any angles and heights depending on usage demand, thereby providing more comfortable support to the user' s arm.

The seat armrest is adapted to be installed on a seat and comprises an elbow-rest segment, an arm-rest segment, a mobilizable connecting structure, and a height-locking structure. The elbow-rest segment is adapted to be connected to the seat, and supports an elbow of a user sitting on the seat. The arm-rest segment supports a forearm of the user. The mobilizable connecting structure is connected to the elbow-rest segment and the arm-rest segment, and facilitates the arm-rest segment to surround the mobilizable connecting structure to pivot toward a space above the elbow-rest segment. The height-locking structure is connected to the elbow-rest segment and the arm-rest segment. When the arm-rest segment is pivoted to any desired heights, the height-locking structure can fix the arm-rest segment on said desired height.

When the armrest is in use, the user rests the elbow on the elbow-rest segment and the forearm on the arm-rest segment. The user can pivot the arm-rest segment upward to the desired height by the mobilizable connecting structure, and then can fix the arm-rest segment at said desired height by the height-locking structure. As a result, the user can adjust the laying height of the forearm freely according to different occasions, so that the user can lay his forearm comfortably.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
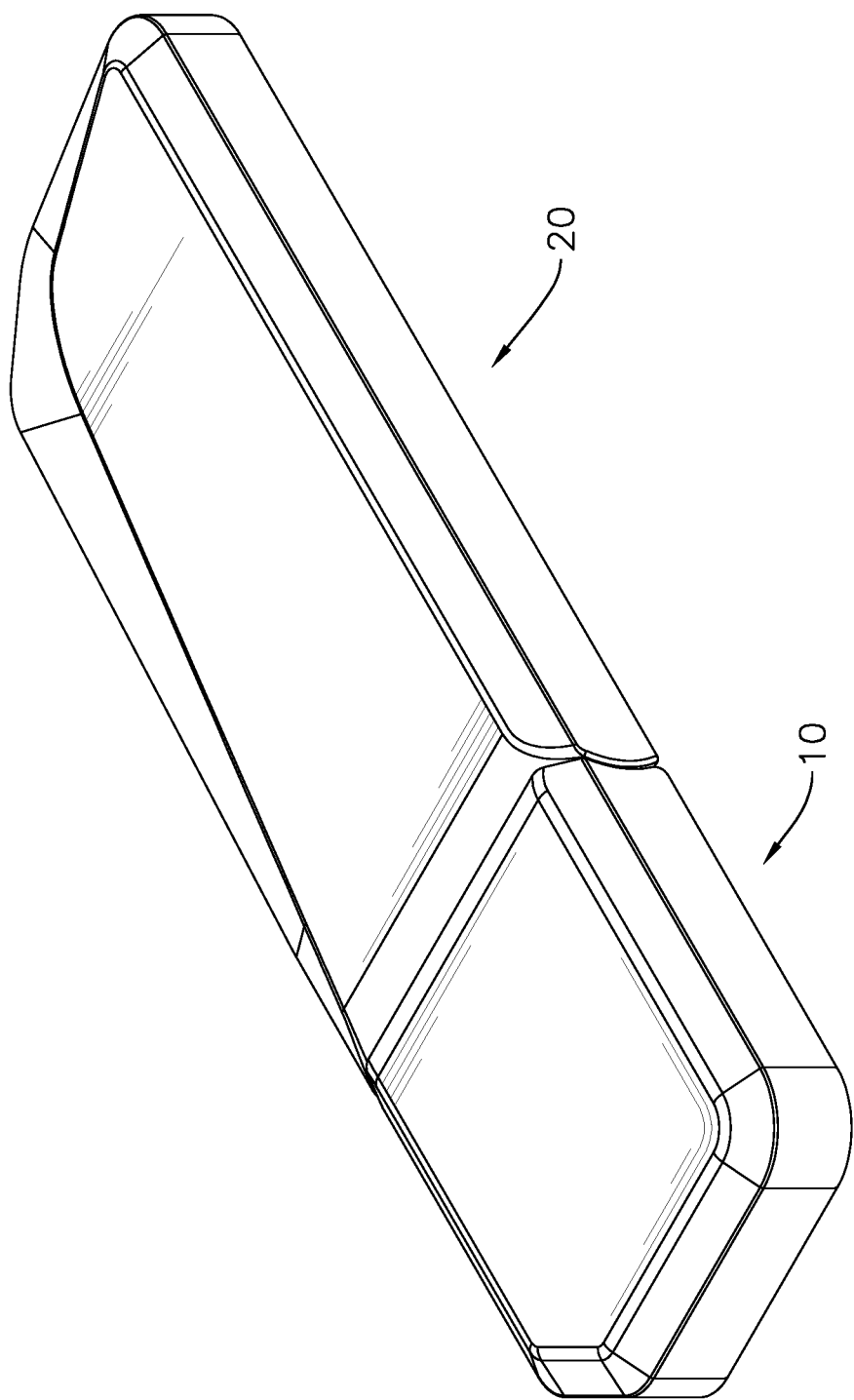
FIG. 1 is a perspective view of a first embodiment of a seat armrest in accordance with the present invention.
Figure 4:
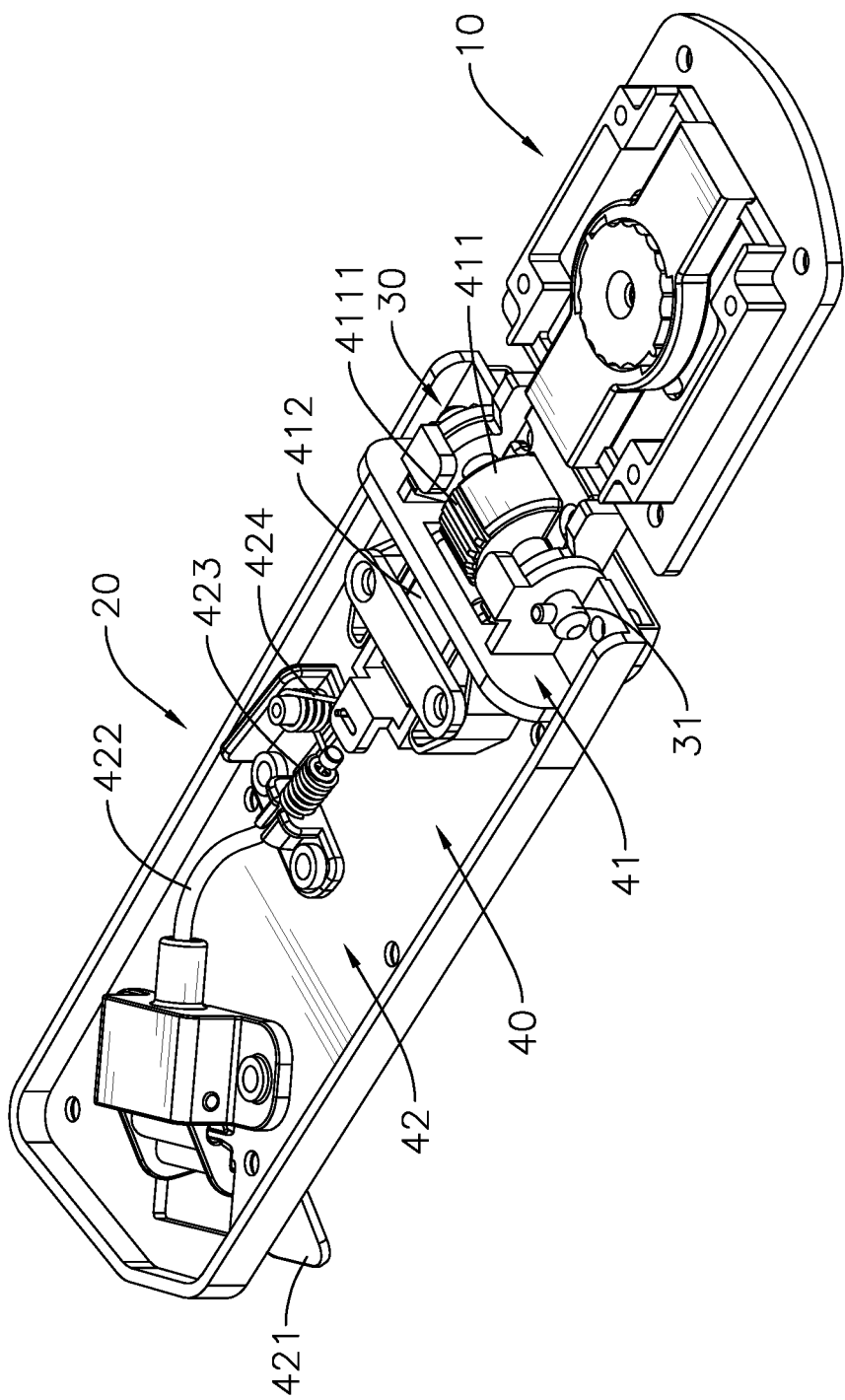
FIG. 4 is an exploded perspective view of some inner components of the seat armrest in FIG. 1.
Figure 12:
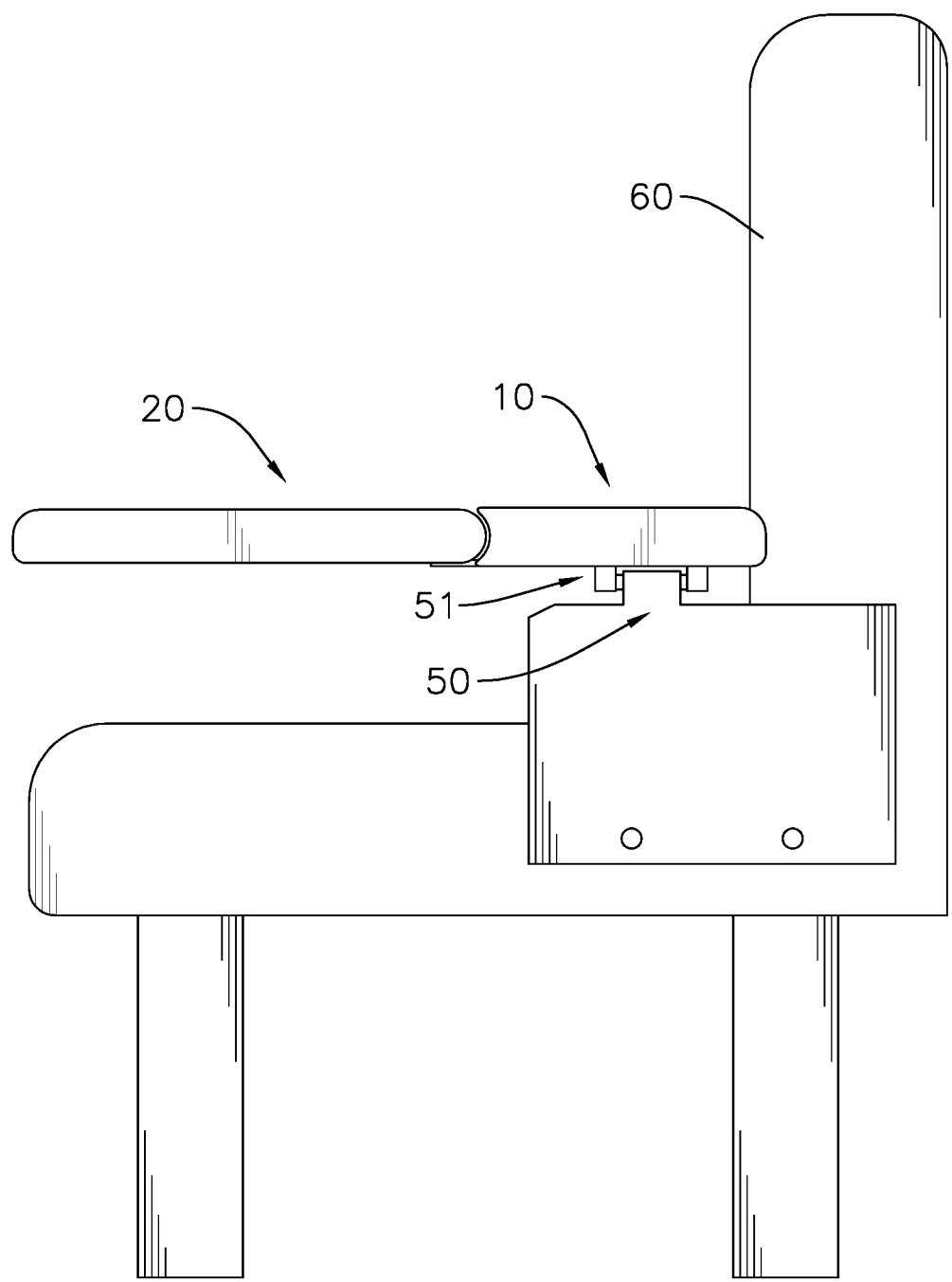
FIG. 12 is a side view of a fourth embodiment of a seat armrest in accordance with the present invention, shown mounted on a seat.

With reference to FIGS. 1, 4, and 12, a seat armrest in accordance with the present invention is adapted to be mounted on a seat 60, and the seat armrest comprises an elbow-rest segment 10, an arm-rest segment 20, a mobilizable connecting structure 30, and a height-locking structure 40.

The elbow-rest segment 10 is connected to the seat 60 and is for supporting an elbow of a user sitting on the seat. The arm-rest segment 20 is for supporting a forearm of the user. The mobilizable connecting structure 30 is connected to the elbow-rest segment 10 and the arm-rest segment 20, and facilitates the arm-rest segment 20 to surround the mobilizable connecting structure 30 to pivot toward a space above the elbow-rest segment 10. The height-locking structure 40 is connected to the elbow-rest segment 10 and the arm-rest segment 20. When the arm-rest segment 20 is pivoted to any desired height, the height-locking structure 40 can fix the arm-rest segment 20 at the desired height, so that the user can adjust the laying height of his forearm freely according to different occasions.

According to the aforementioned invention purpose, the mobilizable connecting structure 30 and the height-locking structure 40 of the present invention can be altered in various embodiments, and can achieve a larger range of angle adjustment with an armrest rotating structure 50. The present invention has the following embodiments.

First, the armrest rotating structure 50 is mounted between the elbow-rest segment 10 and the seat 60, thereby enabling the whole elbow-rest segment 10 and the whole arm-rest segment 20 to pivot relative to the seat 60 to increase the adjustment range of the angles. The armrest rotating structure 50 at least comprises the following two configurations.

Figure 9:
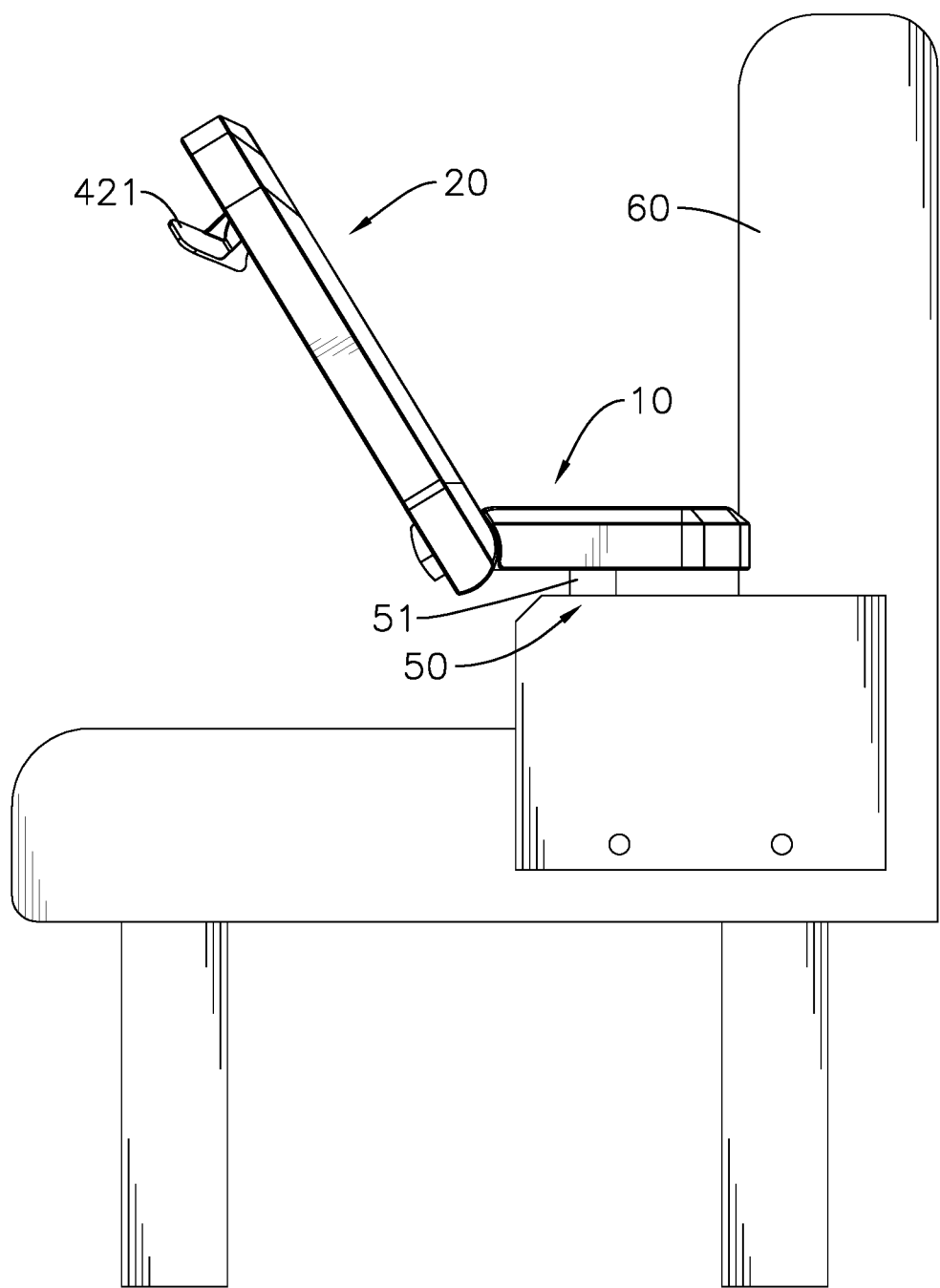
FIG. 9 is a side view of the seat armrest in FIG. 8, shown mounted on a seat.

In the second embodiment as shown in FIG. 9, the armrest rotating structure 50 has an upright rotation shaft 51, so that the elbow-rest segment 10 can be pivoted left or right relative to the seat 60.

In the fourth embodiment as shown in FIG. 12, the armrest rotating structure 50 has a rotation shaft 51 extending front and rear to make the elbow-rest segment 10 pivot upward and downward toward a transverse side of the seat 60.

Figure 3:
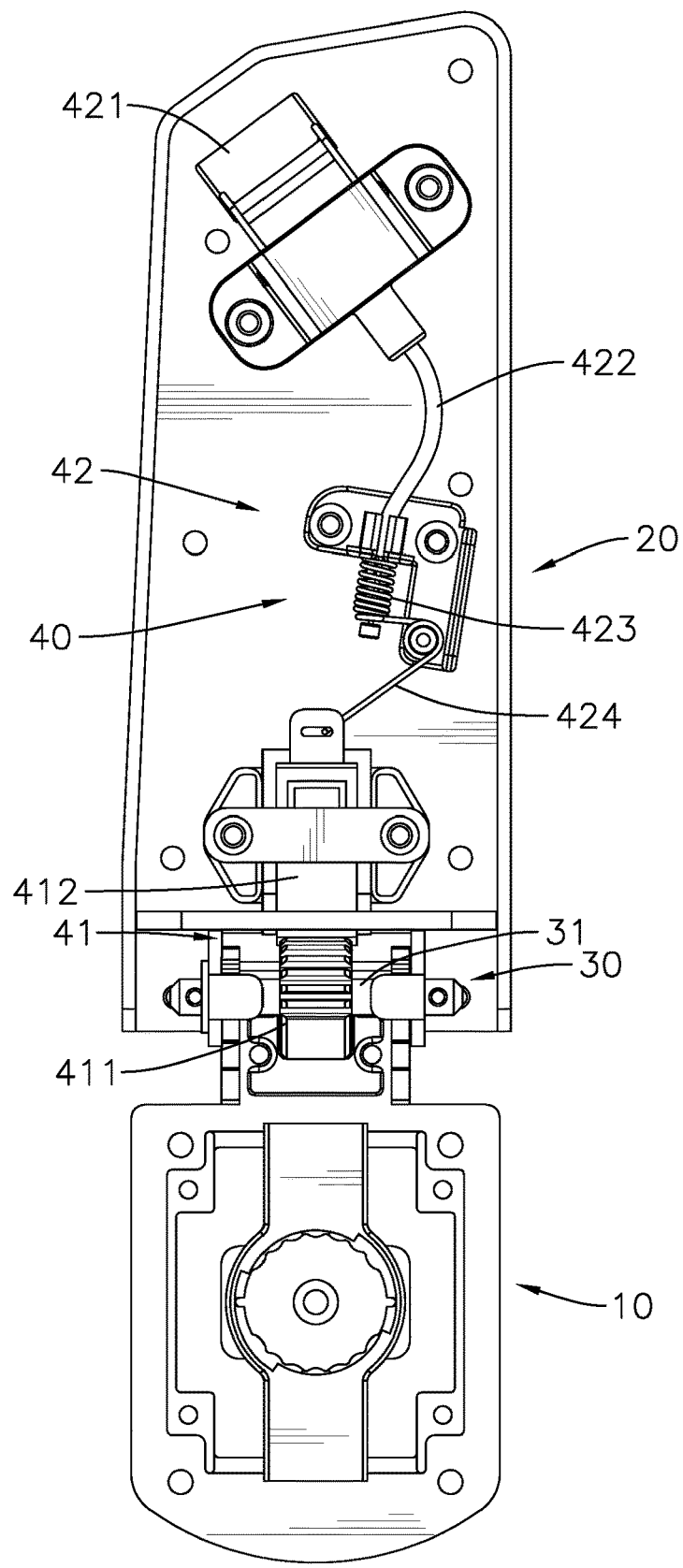
FIG. 3 is a top view of some inner components of the seat armrest in FIG. 1.
Figure 20:
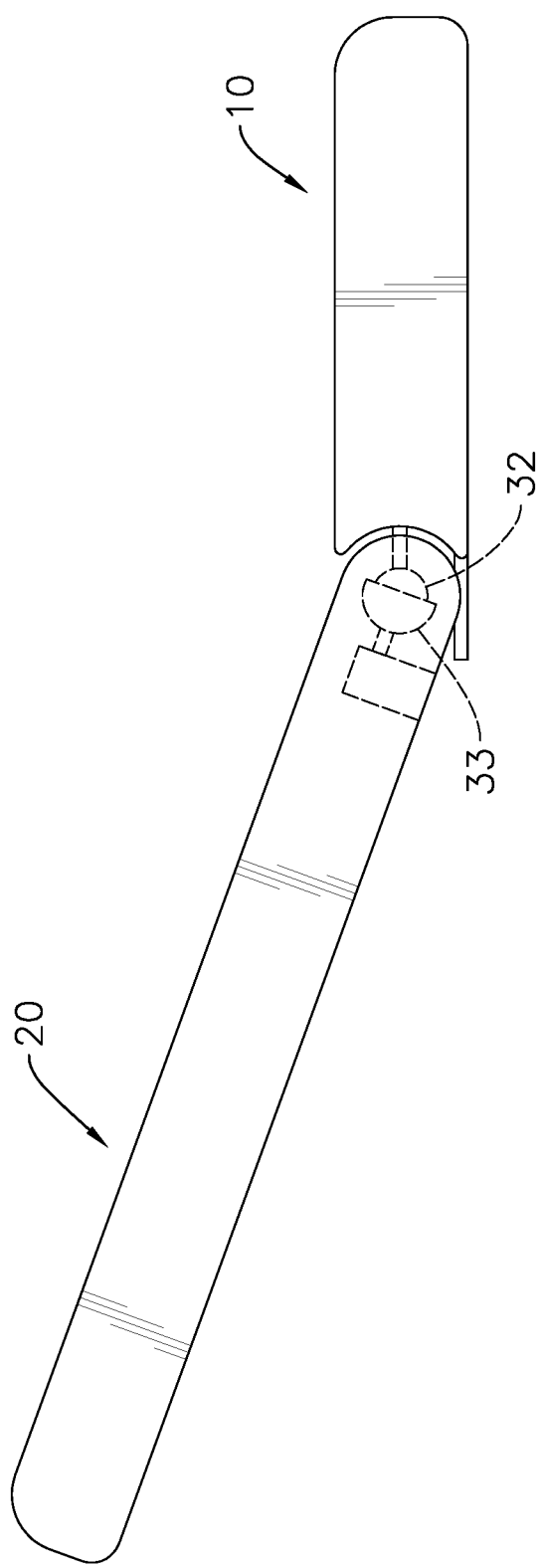
FIG. 20 is a side view of a tenth embodiment of a seat armrest in accordance with the present invention.

Second, the mobilizable connecting structure 30 may comprise two configurations, which respectively are a pivot connection structure as shown in FIG. 3 and a ball joint as shown in FIG. 20. But the mobilizable connecting structure 30 is not limited to the above two configurations.

With reference to FIGS. 3, the pivot connection structure has a rotating shaft 31 extending horizontally. The arm-rest segment 20 is pivoted on the rotating shaft 31 and pivoted upward and downward relative to the elbow-rest segment 10. The pivot connection structure has the following configurations according to a disposed angle of the rotating shaft 31.

Figure 2:
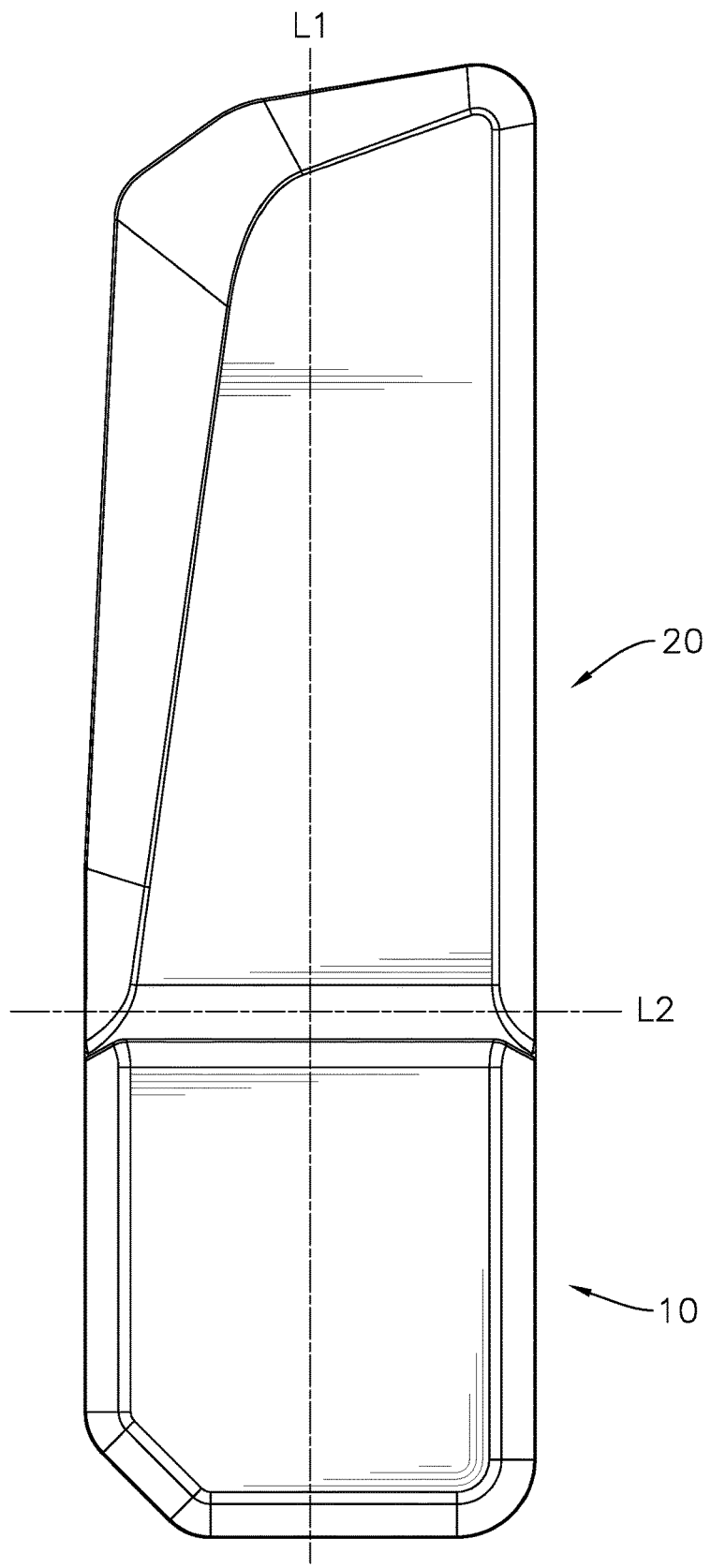
FIG. 2 is a top view of the seat armrest in FIG. 1.

In the first embodiment as shown in FIG. 2, the elbow-rest segment 10 and the arm-rest segment 20 has a common lengthwise direction L1, and the lengthwise direction L1 is perpendicular to the rotating shaft 31 (with reference to an extension line L2 of the rotating shaft 31) of the pivot connection structure.

Figure 8:
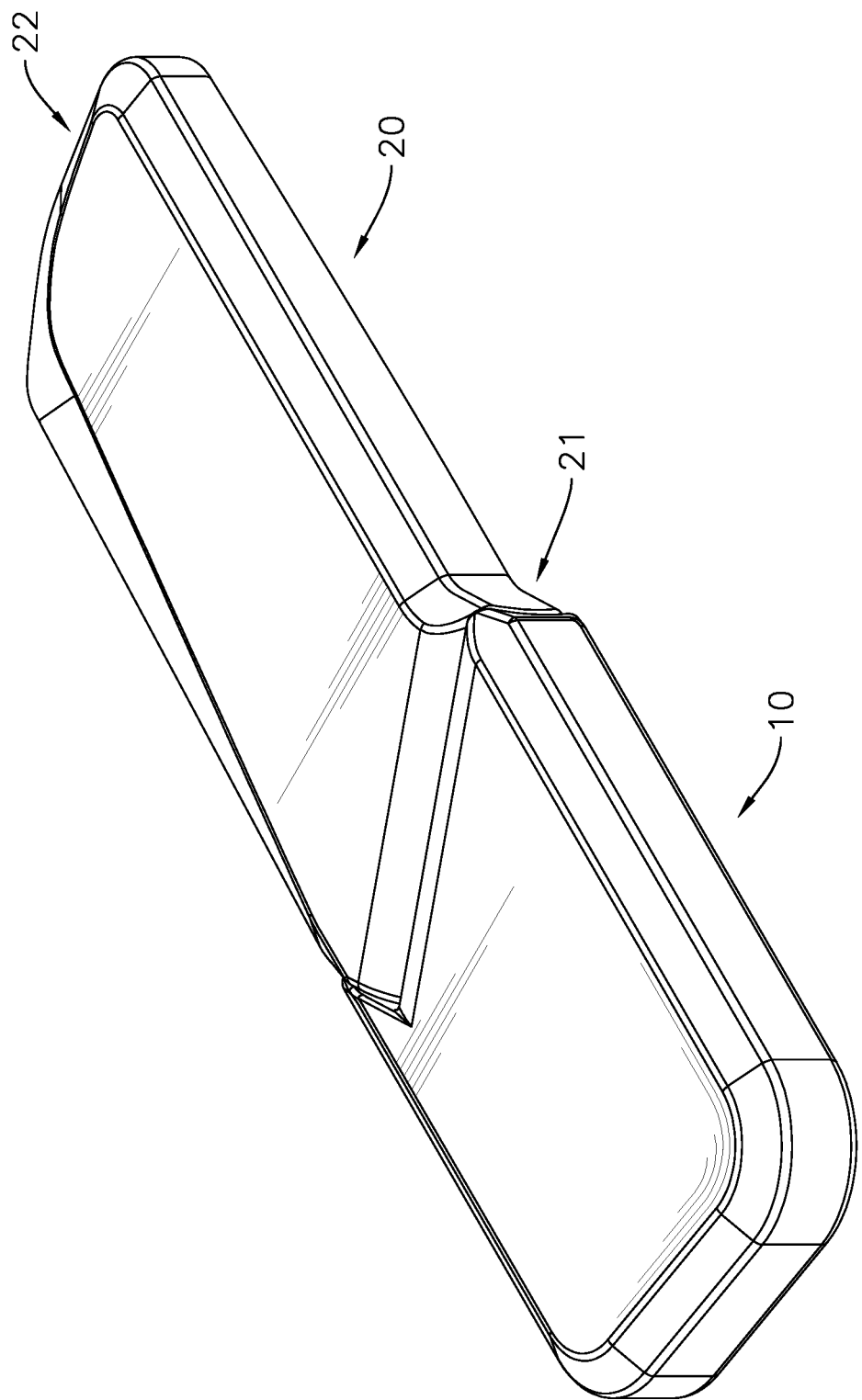
FIG. 8 is a perspective view of a second embodiment of a seat armrest in accordance with the present invention.
Figure 10:
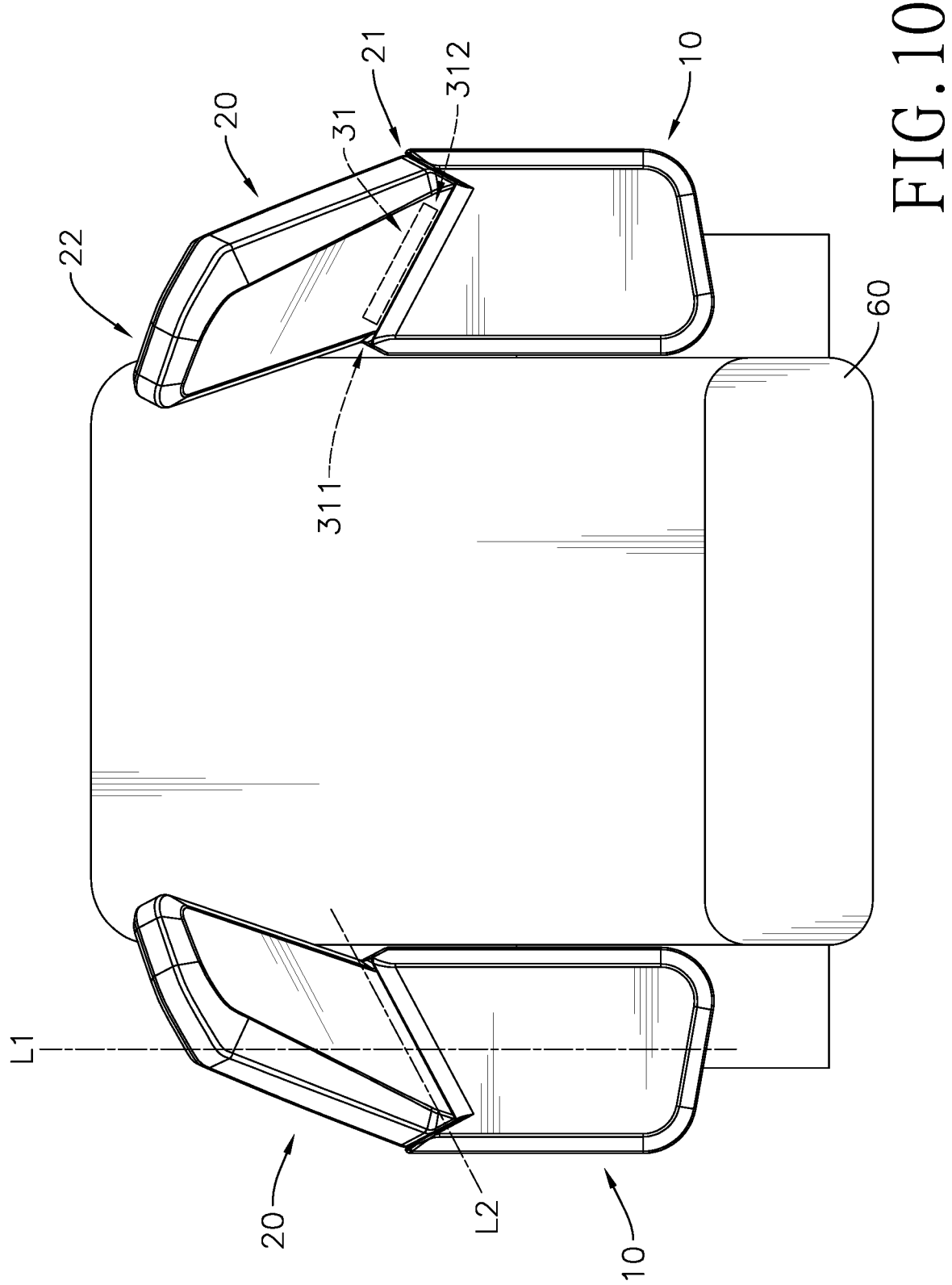
FIG. 10 is a top view of the seat armrest in FIG. 8, shown mounted on the seat.

In the second embodiment as shown in FIGS. 8 and 10, the rotating shaft 31 of the pivot connection structure extends obliquely. That is, an angle between the lengthwise direction L1 of the elbow-rest segment 10 and the arm-rest segment 20 and the rotating shaft 31 (with reference to the extension line L2) is larger than 0 degree and smaller than 90 degrees. Furthermore, such situation can further include the following two configurations.

In the second embodiment as shown in FIG. 10, two seat armrests in accordance with the present invention are disposed symmetrically to each other, and the rotating shaft 31 is oblique toward an inner side of the seat 60 (with reference to the extension line L2). To be specific, two ends of the arm-rest segment 20 are respectively a free end 22 and a connecting end 21. The connecting end 21 is connected to the mobilizable connecting structure 30. Two ends of the rotating shaft 31 are respectively an inner side end 311 and an outer side end 312. The inner side end 311 is nearer to the seat 60 than the outer side end 312, which means the rotating shaft 31 is oblique toward the inner side of the seat 60, and also means the inner side end 311 is nearer to the free end 22 of the arm-rest segment 20 than the outer side end 312.

Figure 11:
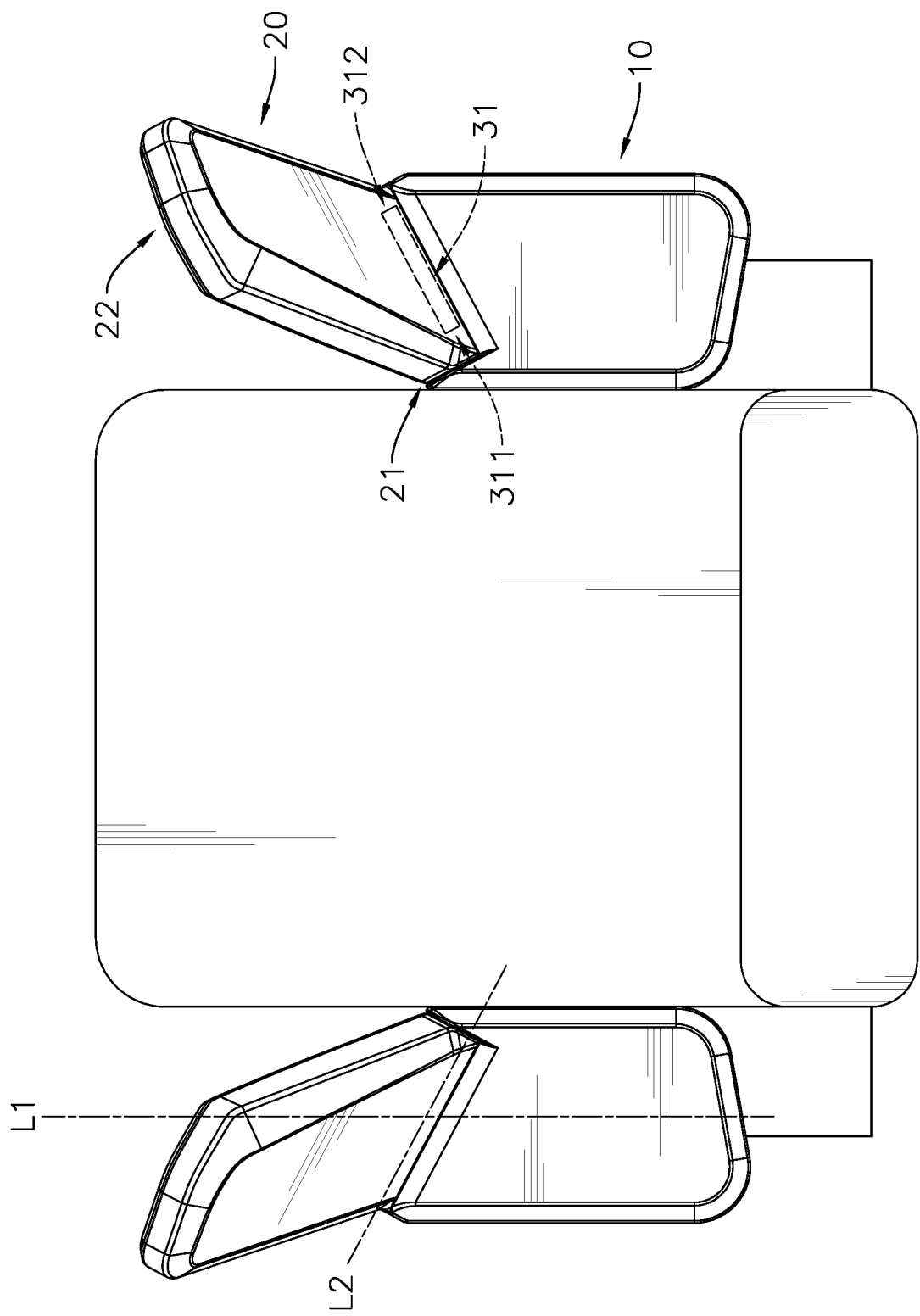
FIG. 11 is a top view of a third embodiment of a seat armrest in accordance with the present invention, shown mounted on a seat.

In the third embodiment as shown in FIG. 11, the rotating shaft 31 is oblique toward an outer side of the seat 60 (with reference to the extension line L2). That is, the outer side end 312 of the rotating shaft 31 is nearer to the free end 22 of the arm-rest segment 20 than the inner side end 311.

Various alternatives of the pivot connection structure are as above-mentioned. Another configuration of the mobilizable connecting structure 30 is the ball joint. With reference to FIGS. 20, in the tenth embodiment, the ball joint comprises a ball head 32 and a hemispherical cover 33. The ball head 32 is mounted securely on the elbow-rest segment 10. The hemispherical cover 33 is mounted securely on the arm-rest segment 20, and is rotatably and tightly mounted around the ball head 32, so that the hemispherical cover 33 is rotatable front and rear, right and left, and up and down relative to the ball head 32. Furthermore, the ball head 32 also can be mounted securely on the arm-rest segment 20, and the hemispherical cover 33 is mounted securely on the elbow-rest segment 10, which also can achieve the same function.

Figure 16:
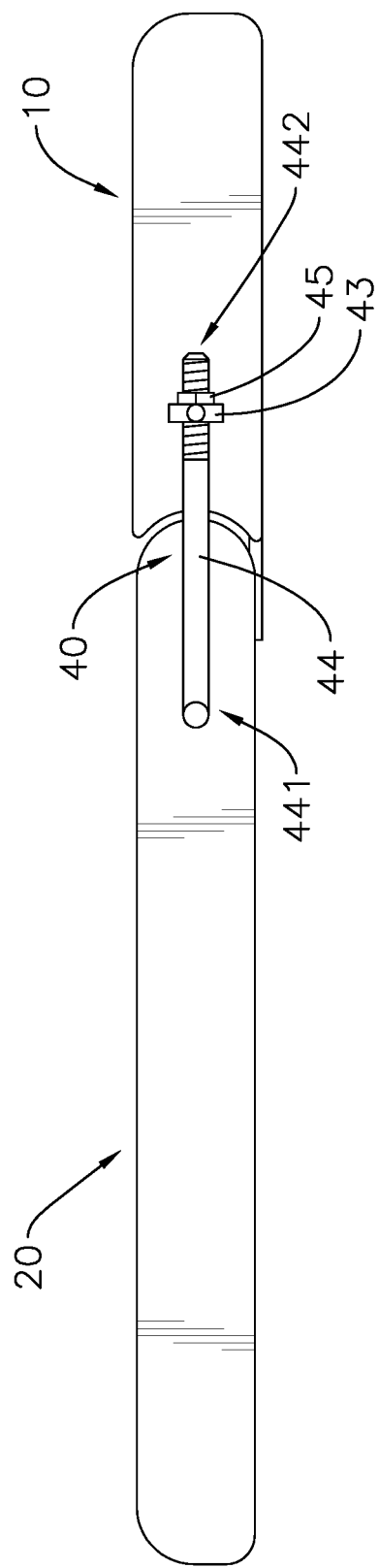
FIGS. 16 to 18 are side operational views of an eighth embodiment of a seat armrest in accordance with the present invention.

Third, the height-locking structure 40 can include two configurations, which respectively are an assembly of an engagement fixing structure 41 and a driving structure 42 as shown in FIG. 3 and an assembly of a fixing ring 43, a pivot rod 44 and a drop-stop nut 45 as shown in FIG. 16. But the height-locking structure 40 is not limited to the above two configurations.

Figure 5:
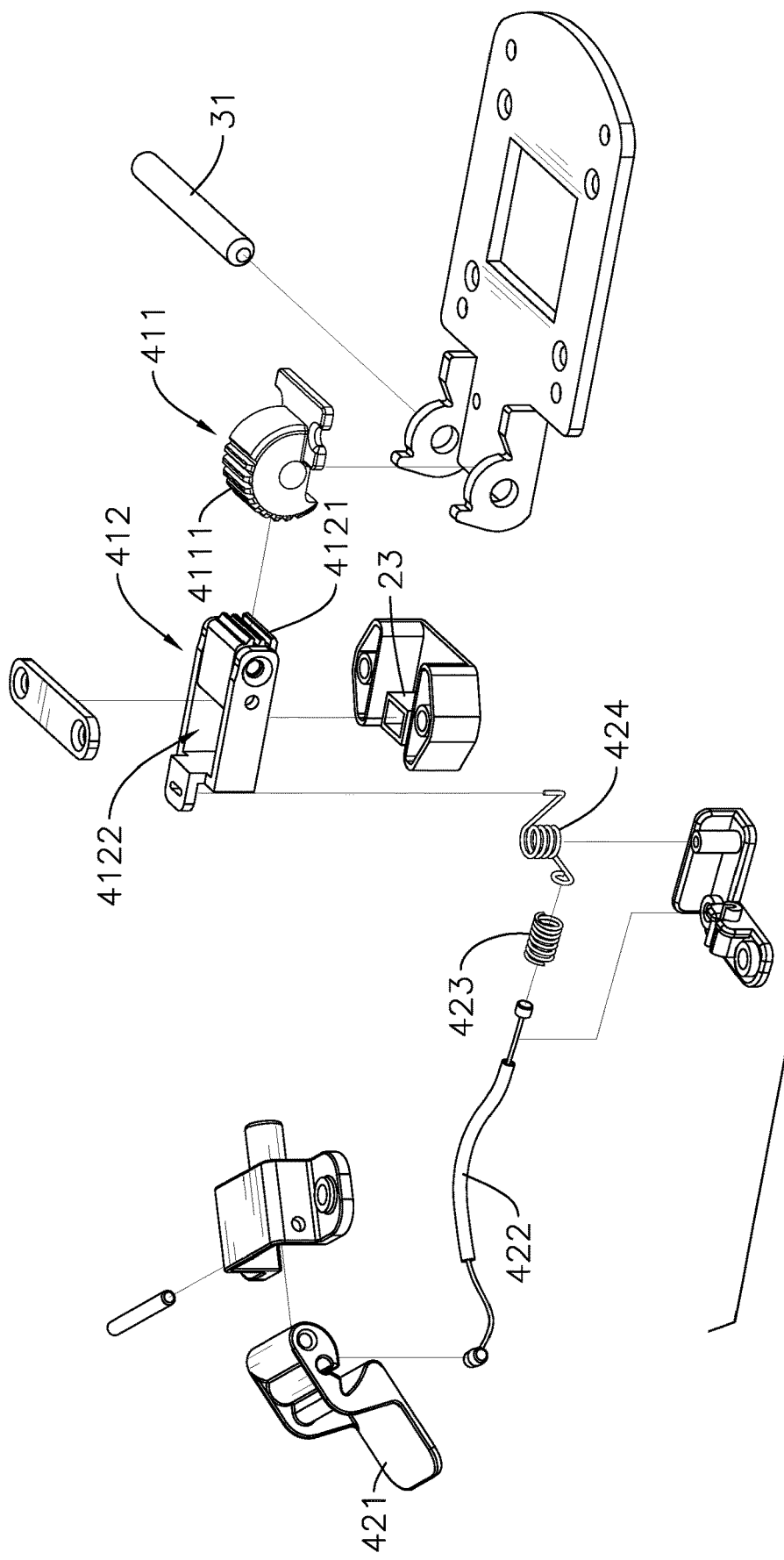
FIG. 5 is an exploded perspective view of the seat armrest in FIG. 1.
Figure 6:
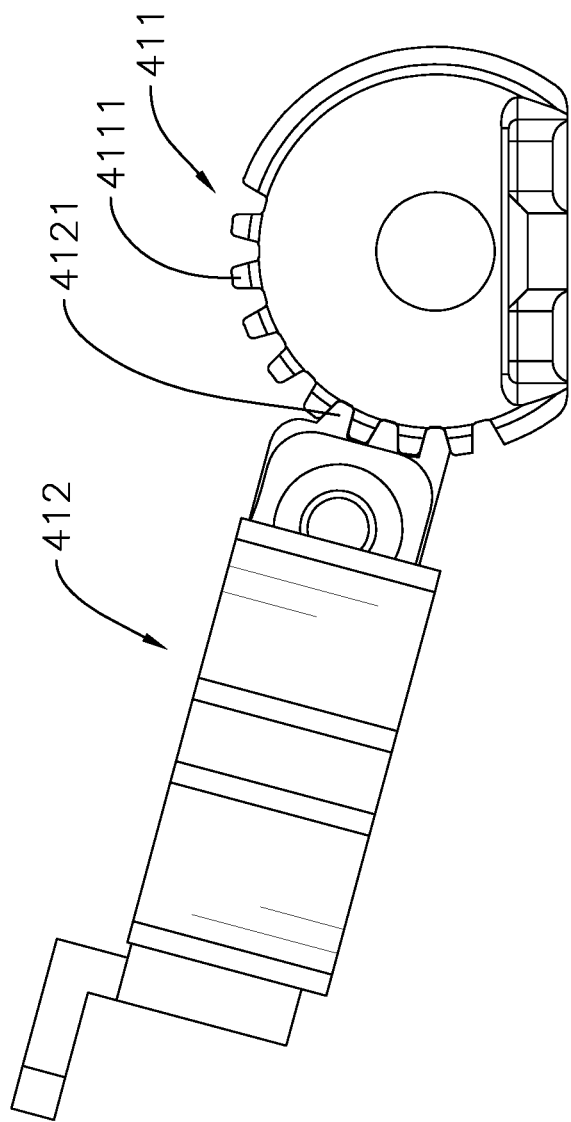
FIG. 6 is an operational view of the seat armrest in FIG. 1, showing the engagement between an engaging wheel and an engaging block.
Figure 7:
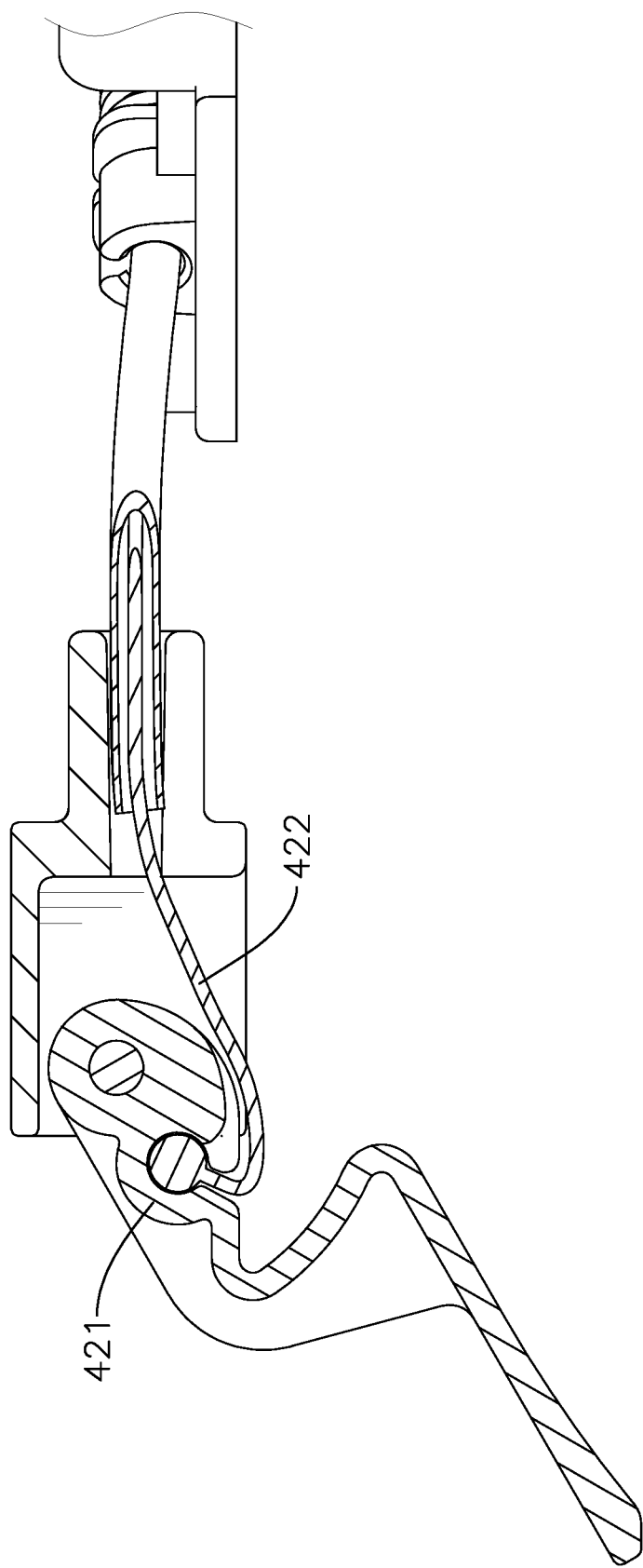
FIG. 7 is a side view in partial section of a pulling element and a pulling rope of the seat armrest in FIG. 1.

In the first embodiment as shown in FIGS. 3 to 5, the engagement fixing structure 41 and the driving structure 42 are mainly for use with the pivot connection structure.

The engagement fixing structure 41 comprises an engaging wheel 411 and an engaging block 412. The engaging wheel 411 is mounted securely in the elbow-rest segment 10, and is mounted around the rotating shaft 31 of the pivot connection structure. The engaging wheel 411 has multiple teeth 4111 on an outer annular surface of the engaging wheel 411. The engaging block 412 is movably mounted in the arm-rest segment 20, and has multiple teeth 4121 on an end that is toward the engaging wheel 411. With the movement of the engaging block 412, the teeth 4121 of the engaging block 412 selectively engage with the teeth 4111 of the engaging wheel 411. When the engaging block 412 engages with the engaging wheel 411, the arm-rest segment 20 cannot be pivoted relative to the elbow-rest segment 10, thereby fixing the arm-rest segment 20 on the desired height.

In addition, the arm-rest segment 20 has a guiding protrusion 23, and the engaging block 412 has a guiding recess 4122. The guiding recess 4122 is elongated, and an extending direction of the guiding recess 4122 is parallel with a moving direction of the engaging block 412 relative to the arm-rest segment 20. The guiding recess 4122 is located around the guiding protrusion 23, so that the engaging block 412 can only move in a straight line relative to the arm-rest segment 20.

The driving structure 42 is mounted in the arm-rest segment 20, and can move the engaging block 412 to make the engaging block 412 engage with the engaging wheel 411 or to make the engaging block 412 separate from the engaging wheel 411. The driving structure 42 can further comprise the following configurations.

In the first embodiment as shown in FIGS. 3 to 7, the driving structure 42 further comprises a pulling element 421, a pulling rope 422, a compression spring 423, and a torsion spring 424. The pulling element 421 is mounted in and pivotally connected to the arm-rest segment 20. One of two ends of the pulling element 421 protrudes out of the arm-rest segment 20 for pulling by a hand of the user. Two ends of the pulling rope 422 are respectively a first end and a second end. The first end is connected to the pulling element 421. When the pulling element 421 is pulled and is pivoted relative to the arm-rest segment 20, the pulling element 421 pulls the pulling rope 422. The compression spring 423 pushes the second end of the pulling rope 422 toward the engaging wheel 411. Two ends of the torsion spring 424 are respectively connected to the second end of the pulling rope 422 and the engaging block 412, and the torsion spring 424 pushes the engaging block 412 toward the engaging wheel 411. Therefore, normally, the engaging block 412 is pushed to engage with the engaging wheel 411 to fix the arm-rest segment 20 on the desired height. The user only needs to pull the pulling element 421, and the height of the arm-rest segment 20 can be adjusted.

Figure 13:
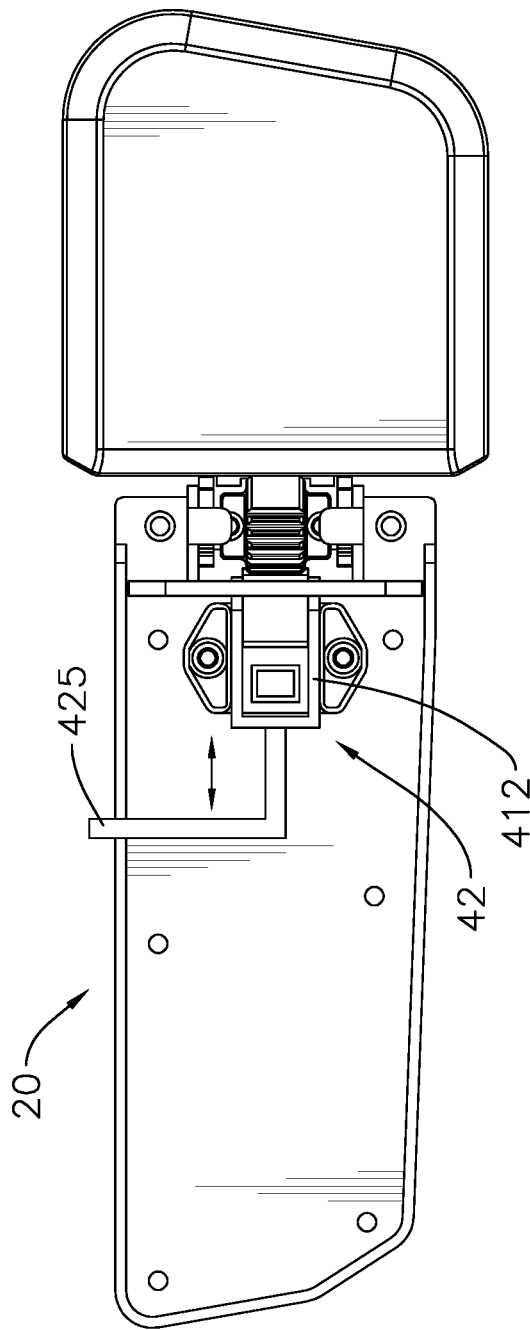
FIG. 13 is a top view of some inner components of a fifth embodiment of a seat armrest in accordance with the present invention.

In the fifth embodiment as shown in FIG. 13, the driving structure 42 only comprises a pulling element 425, which is movably mounted in the arm-rest segment 20. One of two ends of the pulling element 425 protrudes out of the arm-rest segment 20 for pulling by the user. The other end of the pulling element 425 is connected to the engaging block 412. In the fifth embodiment, the engaging block 412 is directly pushed and pulled manually.

Figure 14:
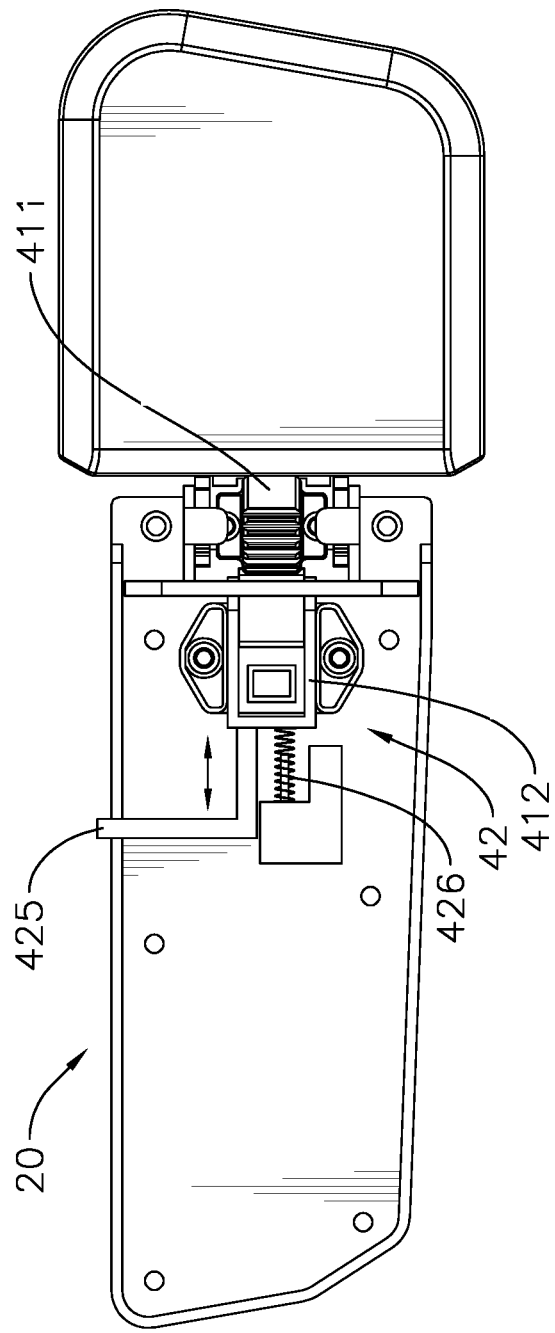
FIG. 14 is a top view of some inner components of a sixth embodiment of a seat armrest in accordance with the present invention.

In the sixth embodiment as shown in FIG. 14, which is similar to the above-mentioned fifth embodiment, the driving structure 42 further comprises a compression spring 426. The compression spring 426 is mounted in the arm-rest segment 20 and pushes the engaging block 412 toward the engaging wheel 411. Therefore, normally, the arm-rest segment 20 is fixed in height, but the height is adjustable after the pulling element 425 is pulled.

Figure 15:
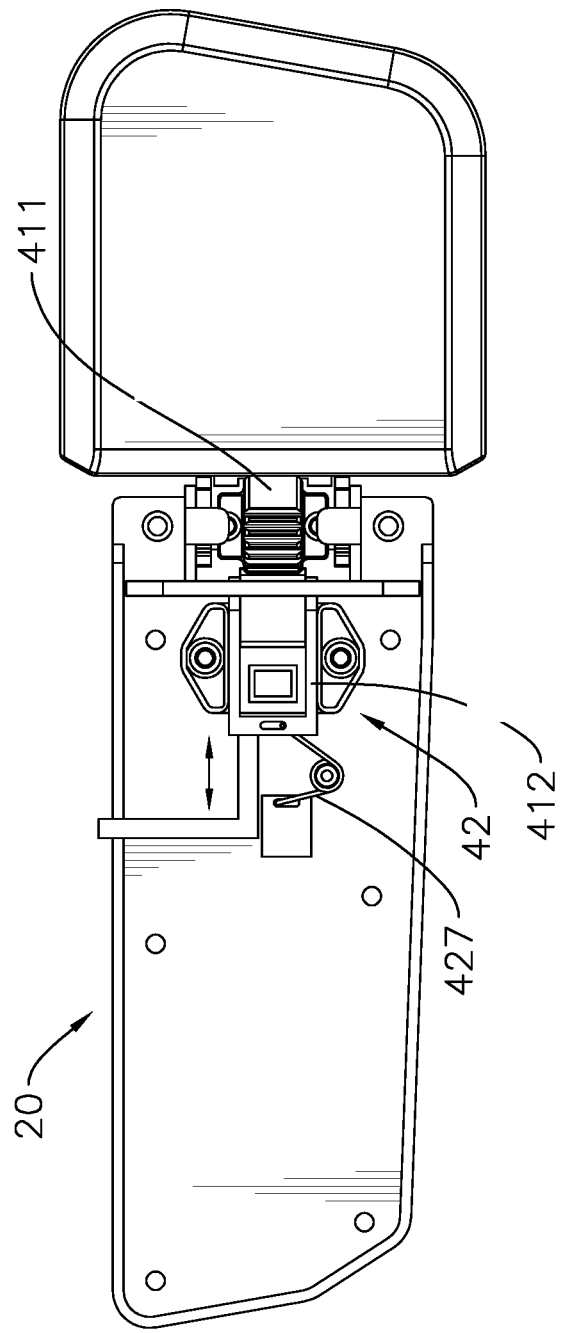
FIG. 15 is a top view of some inner components of a seventh embodiment of a seat armrest in accordance with the present invention.

In the seventh embodiment as shown in FIG. 15, which is similar to the above-mentioned sixth embodiment, the compression spring 426 of the driving structure 42 is replaced with a torsion spring 427. The torsion spring 427 is mounted in the arm-rest segment 20 and pushes the engaging block 412 toward the engaging wheel 411.

Figure 17:
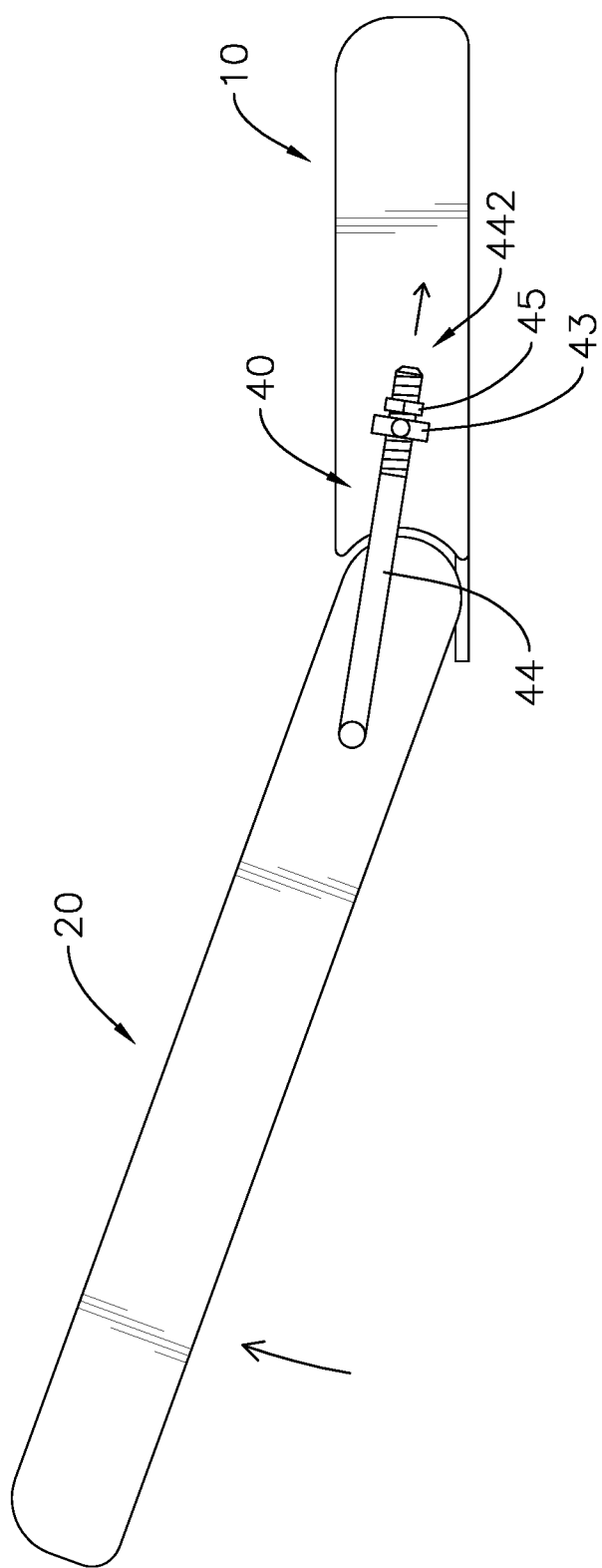
Figure 18:
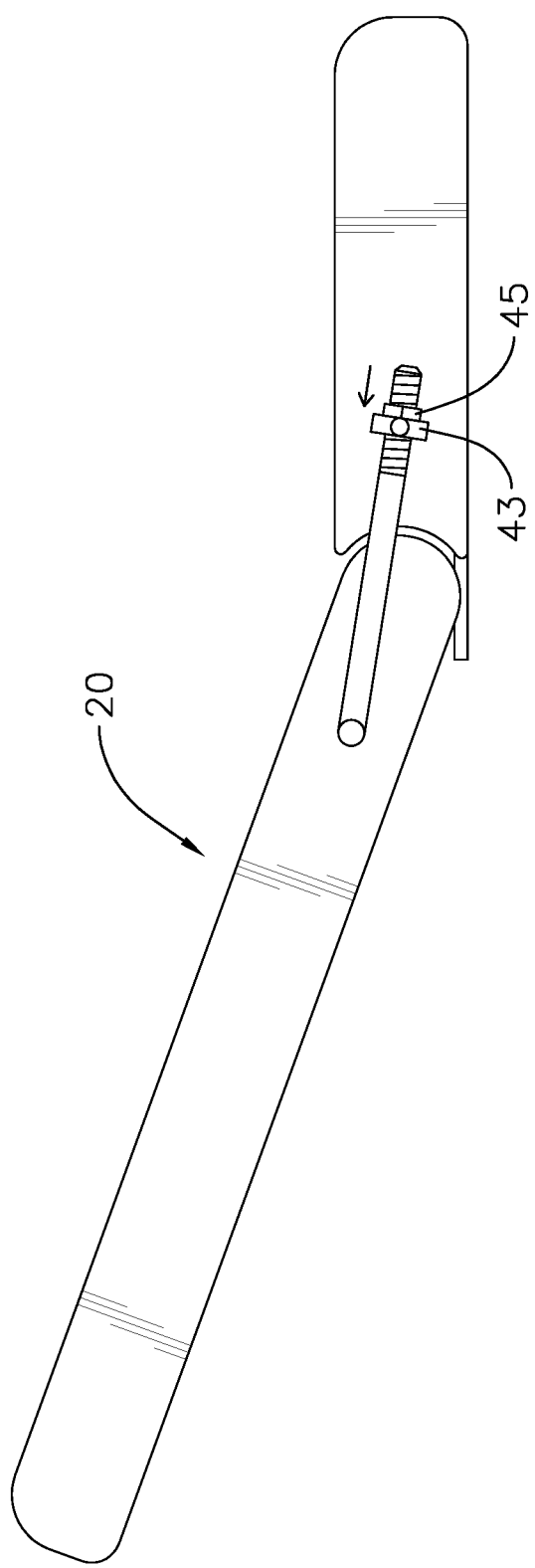

The various alternatives of the assembly of the engagement fixing structure 41 and the driving structure 42 are as abovementioned. As for another configuration of the height-locking structure 40, with reference to FIGS. 16, in the eighth embodiment, the height-locking structure 40 comprises a fixing ring 43, a pivot rod 44 and a drop-stop nut 45. The fixing ring 43 is pivotally connected to a side of the elbow-rest segment 10. Two ends of the pivot rod 44 are respectively a pivot end 441 and an insertion end 442. The pivot end 441 is pivotally connected to a side of the arm-rest segment 20. The insertion end 442 is movably mounted through the fixing ring 43. The drop-stop nut 45 is mounted around and screw-threaded with the pivot rod 44, and selectively abuts the fixing ring 43. The fixing ring 43 is disposed between the drop-stop nut 45 and the pivot end 441 of the pivot rod 44. With reference to FIG. 17, when the arm-rest segment 20 is pivoted upward (between 0 degree and 90 degrees), the insertion end 442 of the pivot rod 44 will be deep into the fixing ring 43. With reference to FIGS. 18, at this time, the drop-stop nut 45 is rotated to abut the fixing ring 43, so that the arm-rest segment 20 cannot be pivoted downward (but can be pivoted upward). Thus, the user can lay his forearm on the arm-rest segment 20. To lower the height of the arm-rest segment 20, the user only needs to reversely rotate the drop-stop nut 45 to separate from the fixing ring 43, and then the arm-rest segment 20 can be pivoted downward.

Figure 19:
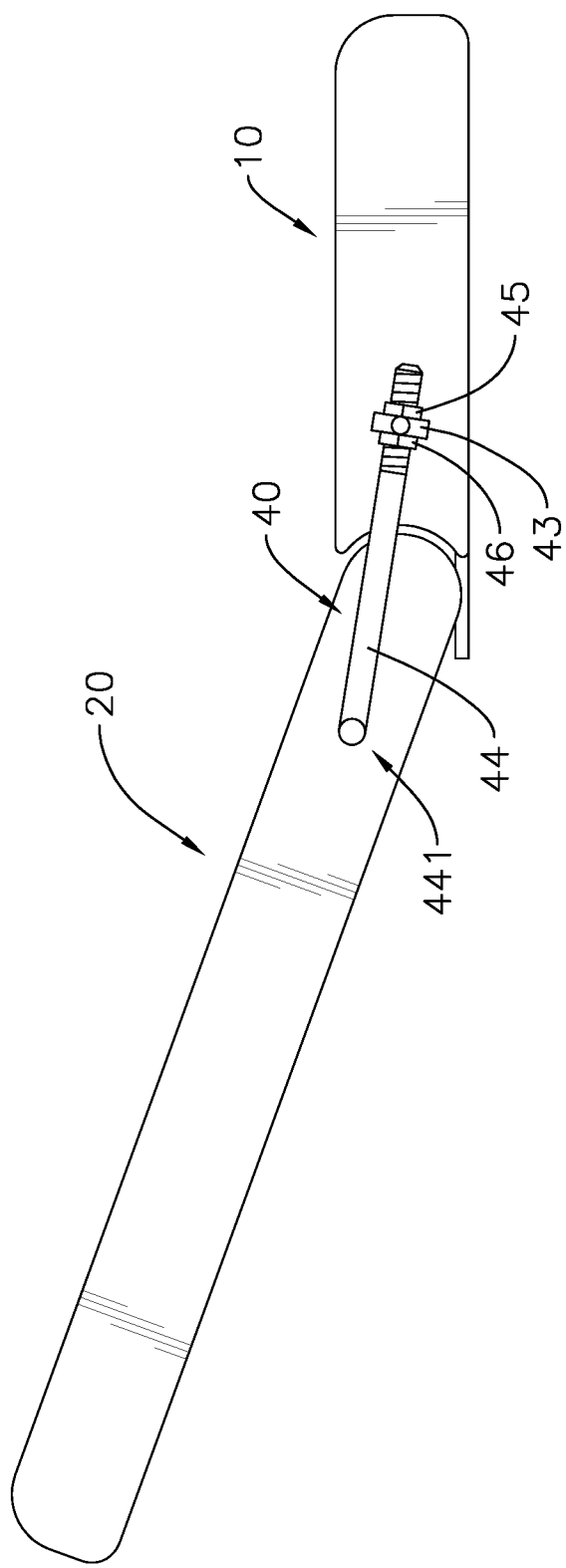
FIG. 19 is a side view of a ninth embodiment of a seat armrest in accordance with the present invention.

With reference to FIG. 19, in the ninth embodiment, the height-locking structure 40 further comprises a lift-stop nut 46, which is mounted around and screw-threaded with the pivot rod 44. The lift-stop nut 46 is disposed between the fixing ring 43 and the pivot end 441 of the pivot rod 44 and selectively abuts the fixing ring 43. When the lift-stop nut 46 abuts the fixing ring 43, the arm-rest segment 20 cannot be pivoted upward, so that the clamping between the lift-stop nut 46 and the drop-stop nut 45 to the fixing ring 43 can totally fix the height of the arm-rest segment 20.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A seat armrest adapted to be installed on a seat and comprising:
   an elbow-rest segment adapted to be connected to the seat for supporting an elbow of a user sitting on the seat;
   an arm-rest segment for supporting a forearm of the user; wherein the elbow-rest segment and the arm-rest segment have a common lengthwise
   a mobilizable connecting structure connected to the elbow-rest segment and the arm-rest segment, and making the arm-rest segment pivot toward a space above the elbow-rest segment; the mobilizable connecting structure comprising
      a pivot connection structure having
         a rotating shaft extending horizontally, and the arm-rest segment pivoted on the rotating shaft to be pivoted upward and downward relative to the elbow-rest segment; an angle between the lengthwise direction and the rotating shaft being larger than 0 degree and smaller than 90 degrees; and
   a height-locking structure connected to the elbow-rest segment and the arm-rest segment; wherein when the arm-rest segment is pivoted to a desired height, the height-locking structure fixes the aim-rest segment at the desired height.

2. The seat armrest as claimed in claim 1, wherein
   two ends of the arm-rest segment are respectively a free end and a connecting end, and the connecting end is connected to the mobilizable connecting structure;
   two ends of the rotating shaft of the pivot connection structure are respectively an inner side end and an outer side end; and
   the inner side end is nearer to the seat than the outer side end, and the inner side end is nearer to the free end of the aim-rest segment than the outer side end.

3. The seat armrest as claimed in claim 1, wherein the height-locking structure comprises
   an engagement fixing structure comprising
      an engaging wheel mounted securely in the elbow-rest segment, mounted around the rotating shaft of the pivot connection structure, and having multiple teeth on an outer annular surface of the engaging wheel; and an engaging block movably mounted in the arm-rest segment, and selectively engaging with the teeth of the engaging wheel; and a driving structure mounted in the arm-rest segment and capable of moving the engaging block to make the engaging block engage with the teeth of the engaging wheel or separate from the engaging wheel.

4. The seat armrest as claimed in claim 3, wherein the driving structure comprises a pulling element movably mounted in the arm-rest segment; one of two ends of the pulling element protruding out of the arm-rest segment for pulling by the user; the other end of the pulling element connected to the engaging block.

5. The seat armrest as claimed in claim 4, wherein the driving structure further comprises a compression spring mounted in the arm-rest segment and pushing the engaging block toward the engaging wheel.

6. The seat armrest as claimed in claim 4, wherein the driving structure further comprises a torsion spring mounted in the arm-rest segment and pushing the engaging block toward the engaging wheel.

7. The seat armrest as claimed in claim 3, wherein the driving structure comprises a pulling element mounted in and pivotally connected to the arm-rest segment; one of two ends of the pulling element protruding out of the arm-rest segment for pulling by the user;

a pulling rope; two ends of the pulling rope being respectively a first end and a second end; the first end connected to the pulling element, and being selectively pulled by the pulling element;

a compression spring pushing the second end of the pulling rope toward the engaging wheel; and a torsion spring; two ends of the torsion spring respectively connected to the second end of the pulling rope and the engaging block; the torsion spring pushing the engaging block toward the engaging wheel.

8. The seat armrest as claimed in claim 3, wherein the arm-rest segment has
a guiding protrusion; and the engaging block has
a guiding recess being elongated; an extending direction of the guiding recess parallel with a moving direction of the engaging block relative to the arm-rest segment; the guiding recess located around the guiding protrusion to limit the engaging block to move in a straight line relative to the arm-rest segment.

* * * * *